United States Patent
Aindow

(10) Patent No.: US 9,413,019 B2
(45) Date of Patent: Aug. 9, 2016

(54) FUEL CELL AND MEMBRANE THEREFORE

(75) Inventor: Tai-Tsui Aindow, Tolland, CT (US)

(73) Assignee: Audi AG, Ingolstadt (DE)

( * ) Notice: Subject to any disclaimer, the term of this patent is extended or adjusted under 35 U.S.C. 154(b) by 75 days.

(21) Appl. No.: 14/239,149

(22) PCT Filed: Aug. 18, 2011

(86) PCT No.: PCT/US2011/048172
§ 371 (c)(1),
(2), (4) Date: Feb. 17, 2014

(87) PCT Pub. No.: WO2013/025216
PCT Pub. Date: Feb. 21, 2013

(65) Prior Publication Data
US 2014/0212788 A1 Jul. 31, 2014

(51) Int. Cl.
*H01M 8/02* (2016.01)
*H01M 8/04* (2016.01)
*H01M 8/10* (2016.01)
*H01M 8/24* (2016.01)

(52) U.S. Cl.
CPC ........ *H01M 8/04201* (2013.01); *H01M 8/1002* (2013.01); *H01M 8/1004* (2013.01); *H01M 8/1067* (2013.01); *H01M 8/241* (2013.01); *H01M 8/248* (2013.01); *H01M 8/1083* (2013.01); *H01M 2008/1095* (2013.01); *H01M 2250/20* (2013.01); *Y02E 60/521* (2013.01); *Y02P 70/56* (2015.11); *Y02T 90/32* (2013.01)

(58) Field of Classification Search
None
See application file for complete search history.

(56) References Cited

U.S. PATENT DOCUMENTS

| | | |
|---|---|---|
| 7,622,215 B2 | 11/2009 | Hori et al. |
| 2003/0013774 A1 | 1/2003 | Mukoyama et al. |
| 2005/0227132 A1 | 10/2005 | Hori et al. |
| 2006/0280981 A1 | 12/2006 | Mehmi |
| 2007/0077475 A1 | 4/2007 | Lai et al. |
| 2009/0269641 A1 | 10/2009 | Harada |
| 2011/0008708 A1 | 1/2011 | Akita et al. |

FOREIGN PATENT DOCUMENTS

| | | |
|---|---|---|
| JP | 2005-285757 A | 10/2005 |
| JP | 2006-164777 A | 6/2006 |
| JP | 2006160902 | 6/2006 |

(Continued)

OTHER PUBLICATIONS

International Search Report for PCT Application No. PCT/US2011/048172 completed on Apr. 19, 2012.
Extended European Search Report, mailed Apr. 7, 2015, for corresponding European Application No. 11870877.5-1359 / 2745343, 5 pages.

(Continued)

*Primary Examiner* — Cynthia K Walls
(74) *Attorney, Agent, or Firm* — Seed IP Law Group PLLC

(57) ABSTRACT

A fuel cell includes first and second flow field plates, and an anode electrode and a cathode electrode between the flow field plates. A polymer electrolyte membrane (PEM) is arranged between the electrodes. At least one of the flow field plates influences, at least in part, an in-plane anisotropic physical condition of the PEM that varies in magnitude between a high value direction and a low value direction. The PEM has an in-plane physical property that varies in magnitude between a high value direction and a low value direction. The PEM is oriented with its high value direction substantially aligned with the high value direction of the flow field plate.

10 Claims, 1 Drawing Sheet

(56) References Cited

FOREIGN PATENT DOCUMENTS

| | | |
|---|---|---|
| JP | 2007066651 | 3/2007 |
| JP | 2008-47395 A | 2/2008 |
| JP | 2009-123356 A | 6/2009 |

OTHER PUBLICATIONS

Lu et al., "Effect of gas diffusion layer modulus and land-groove geometry on membrane stresses in proton exchange membrane fuel cells," *Journal of Power Sources* 196:4646-4654, 2011.

Rawson et al., "A correlation of Young's modulus with yield stress in oriented poly(vinyl chloride)," *Polymer* 15:107-110, 1974.

FUEL CELL AND MEMBRANE THEREFORE

STATEMENT REGARDING FEDERALLY SPONSORED RESEARCH OR DEVELOPMENT

This invention was made with Government support under Contract No. DE-PS36-08GO98009 awarded by the Department of Energy. The Government has certain rights in this invention.

BACKGROUND

This disclosure relates to membranes that are used in fuel cells.

Fuel cells typically include an anode catalyst, a cathode catalyst and an electrolyte material between the anode and cathode catalysts for generating an electric current from a known electrochemical reaction between reactants, such as fuel and an oxidant. The fuel cell may include flow field plates with channels for directing the reactants to the respective catalysts. The electrolyte material may be a polymer layer, typically referred to as a polymer electrolyte membrane or PEM, which is arranged between the flow field plates.

The arrangement of the PEM between the flow field plates can restrict movement of the PEM and thereby cause stresses on the PEM. The PEM is therefore designed with a suitable minimum thickness and made from certain polymer materials in order to limit stress ruptures.

SUMMARY

An exemplary fuel cell includes first and second flow field plates and anode and cathode electrodes between the flow field plates. A polymer electrolyte membrane (PEM) is arranged between the electrodes. At least one of the flow field plates influences, at least in part, an in-plane anisotropic physical condition of the PEM, which varies in magnitude between a high value direction and a low value direction. The PEM has an in-plane physical property that varies in magnitude between a high value direction and a low value direction. The PEM is oriented between the electrodes such that the high value direction of the PEM is substantially aligned with the high value direction of the flow field plate.

The various features and advantages of the disclosed examples will become apparent to those skilled in the art from the following detailed description. The drawings that accompany the detailed description can be briefly described as follows.

DETAILED DESCRIPTION

Figure 1:
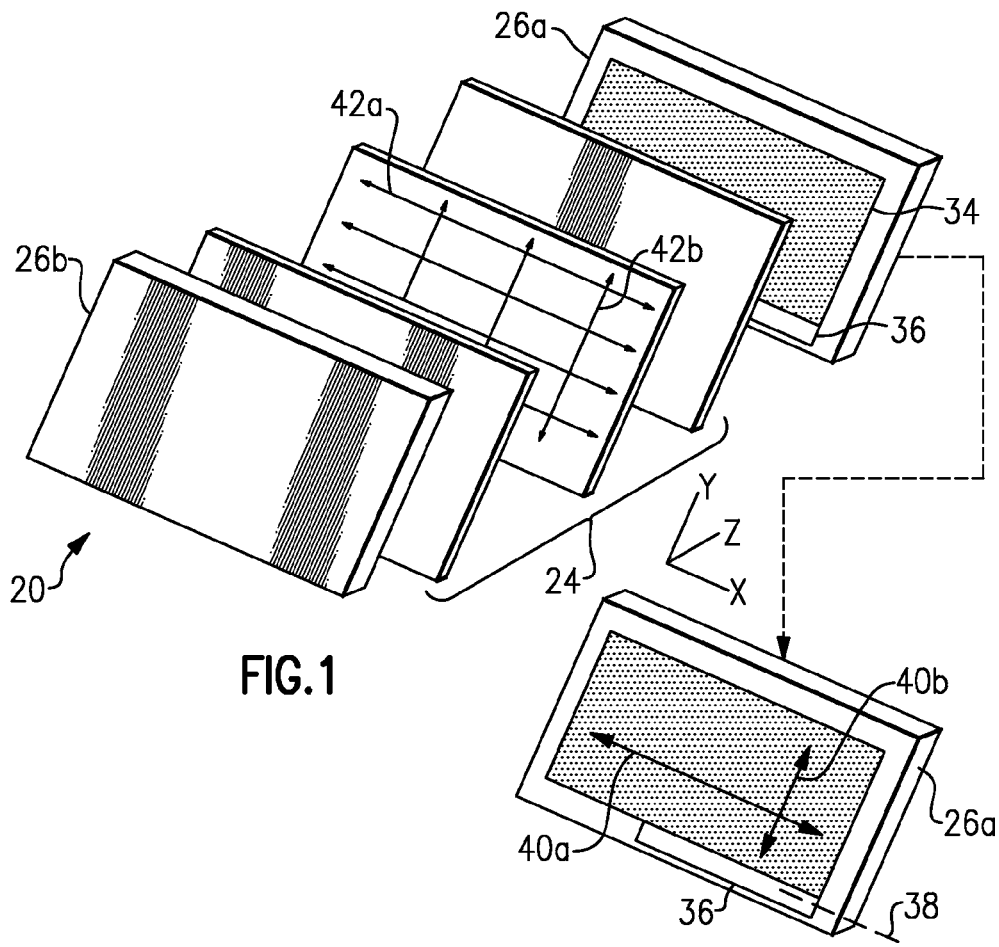
FIG. 1 shows an exploded view of an example fuel cell.
Figure 2:
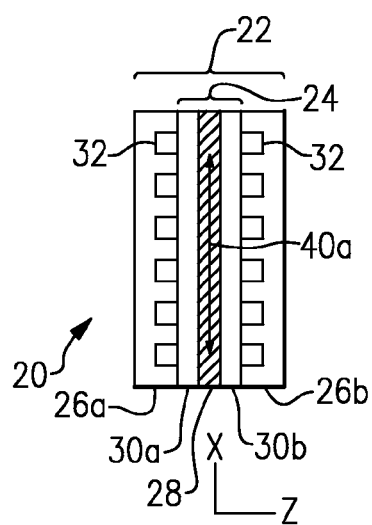
FIG. 2 shows a cross-sectional view of the fuel cell.

FIG. 1 shows an exploded view of selected portions of an example fuel cell 20 for generating an electric current from a known electrochemical reaction between reactant gases, for example. FIG. 2 shows a cross-section of the fuel cell 20 in assembled form. It is to be understood that the disclosed arrangement of the fuel cell 20 is only an example and that the concepts disclosed herein may be applied to other fuel cell arrangements. Additionally, the fuel cell 20 may include other components that are not described in this disclosure or shown in the drawings, such as, but not limited to, cooling channels and gas distribution layers.

The example fuel cell 20 includes one or more fuel cell units 22 that may be stacked in a known manner to provide the assembly of the fuel cell 20. Each of the fuel cell units 22 includes an electrode assembly 24 and flow field plates 26a and 26b for delivering reactant gases (e.g., air and hydrogen) to the electrode assembly 24. The flow field plate 26a may be regarded as an air plate for delivering air and the flow field plate 26b may be regarded as a fuel plate for delivering hydrogen. The flow field plate 26a, flow field plate 26b or both may also circulate coolant (in coolant channels) for maintaining a desired operating temperature of the fuel cell 20 and hydrating the reactant gases.

The electrode assembly 24 includes a polymer electrolyte membrane (PEM) 28, also referred to as a proton exchange membrane, between a cathode catalyst 30a and an anode catalyst 30b. In one example, the PEM 28 is an ionomer. In a further example, the ionomer includes a sulfonated perfluoropolymer. Although not shown, gas diffusion layers may be used between the flow field plates 26a and 26b and the electrode assembly 24 to facilitate distribution of the reactant gases.

Each of the flow field plates 26a and 26b includes channels 32 for delivering the respective reactant gases. The channels 32 of the respective flow field plates 26a and 26b constitute respective flow fields 34. Additionally, each of the flow field plates 26a and 26b may include inlets and outlets for delivering reactant gas to the flow field 34 and receiving unused reactant gas from the flow field 34. In that regard, the flow field plate 26a includes an inlet manifold 36 that extends along one edge of the flow field plate 26a. The inlet manifold 36 is elongated along one edge of the flow field plate 26a with a longitudinal axis 38.

In the arrangement shown, the electrodes 30a, 30b and PEM 28 are essentially clamped between the flow field plates 26a and 26b (e.g., between ribs that form the channels 32). The clamping force restricts movement of the PEM 28 relative to the flow field plates 26a and 26b. As known, the fuel cell 20 is sealed around the perimeter to maintain the reactant gases and water byproduct within the fuel cell 20. The perimeter sealing of the fuel cell 20 may also further restrict movement of the PEM 28.

At least one of the flow field plates 26a or 26b influences, at least in part, an in-plane anisotropic physical condition on the PEM 28 that varies in magnitude between a high value direction ($H_{Fuel\ Cell}$), represented by arrow 40a, and a low value direction ($L_{Fuel\ Cell}$), represented by arrow 40b. In one example, the in-plane anisotropic physical condition comprises the magnitude of stress that is applied to the PEM 28 within the fuel cell 20 due to the clamping force and operational factors of the fuel cell 20. The anisotropic physical condition is not necessarily limited to stress. In other examples, the anisotropic physical condition comprises one or more of electrical conductivity, elongation and heat conductivity.

In one example, the stress is produced during operation of the fuel cell 20 when air enters through the inlet manifold 36 into the channels 32 of the flow field 34 of the flow field plate 26a. The air is initially dry and can have a drying effect on the PEM 28 in the local area near the inlet manifold 36. The dry air tends to absorb moisture from the PEM 28 near the inlet manifold 36. The air flowing through the channels 32 further from the inlet manifold 36 absorbs moisture from the byproduct water and drying is therefore less of a concern in areas of the PEM 28 that are farther away from the inlet manifold 36.

Under high power conditions, such as for vehicle and heavy duty vehicle applications, the fuel cell 20 is also producing a high amount of water byproduct that hydrates the PEM 28 and limits the drying. However, in lower power conditions or between on/off cycles, the PEM 28 may dry out. The change in moisture content of the PEM 28 between the dry condition and the moist condition is therefore more significant for high power fuel cells.

The loss of moisture from the PEM 28 in the area near the inlet manifold 36 causes local shrinking of the PEM 28. However, the flow field plates 26a and 26b and/or the perimeter seal of the fuel cell 20 restrict movement of the PEM 28, which results in stress on the PEM 28. Repeated moisture loss and gain from the on/off cycle of the fuel cell 20 (or between high power and low power conditions of the fuel cell 20) causes a cyclical stress (i.e., fatigue) condition on the PEM 28.

The stress on the PEM 28 is greatest along the high value direction 40a. The stress may be lowest along the low value direction 40b. In the illustrated example, the high value direction 40a is substantially parallel to the longitudinal axis 38 of the elongated inlet manifold 36. Thus, the clamping force of the flow field plates 26a and 26b and the orientation of the inlet manifold 36 at least partially influence the directionality and magnitude of the stress on the PEM 28.

To enhance the durability of the PEM 28 with regard to such stress, the PEM 28 is arranged with a prescribed orientation within the fuel cell 20 in order to resist the stress conditions. In the illustrated embodiment, the PEM 28 has an in-plane physical property that varies in magnitude between a high value direction ($H_{PEM}$), indicated by arrows 42a, and a low value direction ($L_{PEM}$), indicated by arrows 42b. As an example, the in-plane physical property is a strength characteristic, such as the ultimate strength, of the PEM 28 along the given direction.

The PEM 28 in one example comprises an extruded layer that, due to elongation of the polymer chains in the material of the PEM 28, has a higher strength in the extruded direction than in a transverse direction. In that regard, the example PEM 28 has an ultimate strength that is higher in the high value direction 42a than in the low value direction 42b.

In the illustrated embodiment, the PEM 28 is arranged within the fuel cell 20 such that the high value direction 42a is substantially aligned with the high value direction 40a of the flow field plate 26a and is substantially parallel to the longitudinal axis 38 of the elongated inlet manifold 36. For instance, the direction of highest strength of the PEM 28 is substantially aligned with the direction along which the highest stress is applied to the PEM 28 in the fuel cell 20. In some examples, the high value direction 42a and the high value direction 40a are aligned within plus or minus 10° of each other.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A fuel cell comprising:
first and second flow field plates;
a cathode electrode and an anode electrode between the first and second flow field plates; and
a polymer electrolyte membrane (PEM) between the anode electrode and the cathode electrode, at least one of the flow field plates influences, at least in part, an in-plane anisotropic physical condition of the PEM including at least one or more of stress, electrical conductivity, elongation, and heat conductivity, which varies in magnitude between a high value direction ($H_{fuel\ cell}$) and a low value direction ($L_{fuel\ cell}$), the PEM defining an in-plane physical property associated with the anisotropic physical condition that varies in magnitude between a high value direction ($H_{PEM}$) and a low value direction ($L_{PEM}$), and the PEM is oriented between the anode electrode and the cathode electrode such that the $H_{PEM}$ is substantially aligned with the $H_{fuel\ cell}$.

2. The fuel cell as recited in claim 1, wherein the in-plane anisotropic physical condition comprises a stress applied to the PEM, and the in-plane physical property is ultimate strength.

3. The fuel cell as recited in claim 1, wherein at least one of the flow field plates includes a manifold that is elongated along a longitudinal axis, and the $H_{PEM}$ is substantially parallel to the longitudinal axis.

4. The fuel cell as recited in claim 1, wherein one of the flow field plates is an air plate that includes a manifold that is elongated along a longitudinal axis, and $H_{PEM}$ s substantially parallel to the longitudinal axis.

5. The fuel cell as recited in claim 1, wherein the PEM comprises an extruded layer.

6. The fuel cell as recited in claim 1, wherein the PEM is clamped between the flow field plates such that movement of the PEM is restricted.

7. A fuel cell comprising:
a first flow field plate;
a second flow field plate;
a cathode electrode and an anode electrode positioned between the first and second flow field plates; and
a polymer electrolyte membrane (PEM) positioned between the anode electrode and the cathode electrode, at least one of the first and second flow field plates influencing, at least in part, a stress applied to the PEM that varies in magnitude between a high value direction ($H_{fuel\ cell}$) and a low value direction ($L_{fuel\ cell}$), the PEM having a strength property that varies in magnitude between a high value direction ($H_{PEM}$) and a low value direction ($L_{PEM}$), the PEM being oriented between the anode electrode and the cathode electrode such that the $H_{PEM}$ is substantially aligned with the $H_{fuel\ cell}$.

8. The fuel cell of claim 7 wherein at least one of the first and the second flow field plates includes a manifold that is elongated along a longitudinal axis of the manifold, the $H_{PEM}$ being substantially parallel to the longitudinal axis.

9. The fuel cell of claim 7 wherein the PEM comprises an extruded layer.

10. The fuel cell of claim 7 wherein the PEM is clamped between the first and the second flow field plates such that movement of the PEM is restricted.

* * * * *